United States Patent [19]
Norinobu et al.

[11] Patent Number: 6,115,102
[45] Date of Patent: Sep. 5, 2000

[54] LIGHT-SENSITIVE MATERIAL TRANSPORTING DEVICE

[75] Inventors: Tomoya Norinobu, Saitama; Haruhiko Arai, Kanagawa, both of Japan

[73] Assignees: Fuji Photo Film Co., Ltd., Kanagawa; Fuji Photo Optical Co., Ltd., Saitama, both of Japan

[21] Appl. No.: 09/138,282

[22] Filed: Aug. 21, 1998

[30] Foreign Application Priority Data

Aug. 22, 1997 [JP] Japan .................................. 9-226108

[51] Int. Cl.[7] ........................ G03B 29/00; G03B 27/52; G03D 3/08
[52] U.S. Cl. ........................ 355/29; 355/40; 396/612
[58] Field of Search .................. 355/27–29, 40, 355/41, 407; 396/612, 620; 271/265.01, 258.01, 298, 302

[56] References Cited

U.S. PATENT DOCUMENTS

| | | | |
|---|---|---|---|
| 4,734,743 | 3/1988 | Gregory, Sr. ........................ | 355/27 |
| 5,430,520 | 7/1995 | Toki et al. ........................ | 354/319 |
| 5,675,836 | 10/1997 | Matsumoto ........................ | 396/564 |
| 5,993,083 | 11/1999 | Tsuzawa ........................ | 396/612 |

*Primary Examiner*—Eddie C. Lee
*Assistant Examiner*—Hung Henry Nguyen
*Attorney, Agent, or Firm*—Birch, Stewart, Kolasch & Birch, LLP

[57] ABSTRACT

The improved light-sensitive material transporting device includes a belt conveyor for transporting a light-sensitive material as it is placed thereon; and an auxiliary belt conveyor that is driven in the same direction as a transport direction of the belt conveyor and which is spaced above the belt conveyor wherein a distance between the auxiliary belt conveyor and the belt conveyor decrease progressively from upstream to downstream in the transport direction of the light-sensitive material. The light-sensitive material transporting device is capable of transporting the light-sensitive material in a consistent and smooth manner while correcting the "curls" it has. In addition, by adopting the device in the distributing section which distributes individual sheets of the light sensitive material into a plurality of rows, the pathlength of the light-sensitive material can be shortened while, at the same time, the cost of the apparatus is measurably reduced.

10 Claims, 3 Drawing Sheets

LIGHT-SENSITIVE MATERIAL TRANSPORTING DEVICE

BACKGROUND OF THE INVENTION

This invention relates to the technical field of a light-sensitive material transporting device which is to be used in an image recording apparatus that exposes light-sensitive materials to form a latent image.

Heretofore, the image recorded on photographic films such as negatives and reversals (which are hereunder referred to simply as "films") has been commonly printed on light-sensitive materials such as photographic paper by means of direct (analog) exposure, in which projected light from the film is allowed to be incident on the light-sensitive material to achieve its areal exposure.

A new technology has recently been introduced and this is a printer that relies upon digital exposure. Briefly, the image recorded on a film is read photoelectrically, converted to a digital signal and subjected to various image processing operations to produce image data for recording purposes; recording light that has been modulated in accordance with the image data is used to scan and expose a light-sensitive material to record a latent image, which is subsequently developed and output as a print (photograph). The printer operating on this principle has been commercialized as a digital photoprinter.

In the digital photoprinter, the image on a film is read photoelectrically and gradation correction and other operations are performed by subsequent image (signal) processing to determine exposing conditions. Hence, the digital photoprinter has many capabilities in image processing such as editing of printed images by, for example, assembling a plurality of images or splitting a single image into plural images, as well as color/density adjustment and edge enhancement; as a result, prints can be output as needed by specific uses. In addition, the data on a printed image can be supplied into a computer or the like and stored in recording media such as a floppy disk or a hard disk.

A further advantage of the digital photoprinter is that compared to the prints produced by the conventional method of direct exposure, those which are output by the digital photoprinter have better image quality in such aspects as resolution and color/density reproduction.

Having these features, the digital photoprinter is basically composed of an input machine having a scanner (image reader) and an image processor and an output machine having both an exposing device (image recording device) and a developing device.

In the scanner, projected light carrying the image recorded on a film is read photoelectrically with an image sensor such as a CCD sensor and the captured image is sent to the image processor as data for the image on the film (i.e., the image data signal). In the image processor, the image data from the scanner are subjected to specified image processing operations and the resulting output image data for image recording (i.e., exposing conditions) are sent to the exposing device.

In the exposing device, if it is of a type that relies upon exposure by scanning with an optical beam, the latter is modulated in accordance with the received image data and deflected in a main scanning direction as the light-sensitive material is transported in an auxiliary scanning direction perpendicular to the main scanning direction, whereby a latent image is formed as the result of scan exposure of the light-sensitive material with the optical beam and a back print is also recorded. In the developing device, the exposed light-sensitive material is subjected to development and other specified processing operations so as to output a print which reproduces the image that has been recorded on the film.

In the exposing device, whether it is in the digital photoprinter or an ordinary photoprinter that relies upon "direct" exposure, a virgin light-sensitive material is in the form of a magazine, i.e., a roll contained in a lightproof case. The light-sensitive material is withdrawn out of the magazine in the exposing device and further transported for exposure and other necessary steps.

In the ordinary photoprinter, the light-sensitive material being transported is not cut but remains a web as it is subjected to exposure, back print recording, development, rinse, drying and other necessary steps and only after these steps are complete, the light-sensitive material is cut to individual prints of a specified length.

This process requires that frame information (frame punches) for delineating individual frames (or prints) be formed before or during the exposure of the light-sensitive material. However, the portion of the light-sensitive material where the frame information is formed is simply a waste of space. In addition, frame information have to be formed by special means having a punch, a sensor or the like.

In the exposing device of a digital exposure type, the light-sensitive material must be transported for scanning in high precision and without stops in order to record images of high quality that are free from unevenness and other defects. In order to meet this need, the exposing device in the digital photoprinter is adapted to make a slack (loop) out of the light-sensitive material both upstream and downstream of the exposing position but this only increases the complexity of the transport zone for the light-sensitive material and the mechanism for its control.

Under the circumstances, an exposing device is desired that can be incorporated in a digital photoprinter and which is capable of exposing a light-sensitive material after it is cut to sheets corresponding to individual prints to be finally produced. In fact, this need has been satisfied commercially with an analog photoprinter.

In order to produce prints with high efficiency, cut sheets of the light-sensitive material have to be transported smoothly (without jamming or other troubles) over specified paths so that they can be subjected to back printing, exposure and other operations efficiently before they are supplied to the developing machine. However, the cut sheets of the light-sensitive material have "curls" or retain the curvature imparted when the light-sensitive material was in a roll form and jamming is sure to develop unless it is retained positively during transport.

Another factor that must be considered with photoprinters is that development and subsequent steps generally take more time than exposure. Under the circumstances, an apparatus of the type that performs exposure on the cut sheets of the light-sensitive material is adapted to be such that a distributing section is provided between the exposing section and the site at which the light-sensitive material is supplied to the developing machine (this step may be called "entry into the processor"). The cut sheets of the light-sensitive material, before they are fed into the developing machine, are distributed in a direction perpendicular to the direction of their transport so as to form a plurality of rows that overlap in the transport direction. In this way, the throughput of the developing machine can be improved over the case where individual sheets of the light-sensitive material are processed in a single row (almost doubled in two rows and tripled in three rows) and the difference in speed between exposure and development processing is practically cancelled.

If jamming or other troubles occur in this distributing section, the light-sensitive material is adversely affected either during exposure or in the midst of its entry into the developing machine and only inappropriate prints will be produced.

What is more, distribution of the cut sheets of the light-sensitive material should not affect its exposure and entry into the processor. In order to meet this requirement, the conventional distributing section is adapted to consist of three blocks, a high-speed transport block, a distributing block and a speed regulating block; in the high-speed transport block, the sheets of light-sensitive material emerging from the exposing section are transported into the distributing block at high speed so that the distance to the next coming sheet is long enough to secure the time necessary for performing the intended distribution and in the distributing block, the sheets are distributed sidewise by a suitable method such as moving the sheets sidewise together with the transport means and thereafter transported into the speed regulating block, where the transport speed of the sheets is adjusted to one that is compatible with development before they are fed into the developing machine. As the result, the pathlength of the light-sensitive material in the distributing section increased considerably and the size and cost of the photoprinter will increase accordingly.

SUMMARY OF THE INVENTION

The present invention has been accomplished under these circumstances and has as an object providing a light-sensitive material transporting device for use in an image recording apparatus (exposing apparatus) that performs exposure, preferably digital scan exposure, on cut sheets of a light-sensitive material and which feeds the exposed cut sheets into a developing machine. The device is capable of transporting the light-sensitive material in a consistent and smooth manner while correcting the "curls" it has. In addition, by adopting the device in the distributing section which distributes individual cut sheets of the light-sensitive material into a plurality of rows, the pathlength of the light-sensitive material can be shortened while, at the same time, the cost of the apparatus is measurably reduced.

In order to attain this object, the invention provides a light-sensitive material transporting device for transporting a light-sensitive material of a cut sheet type having a specified length in a transport direction in an image recording apparatus that exposes said light-sensitive material to form a latent image and which feeds the exposed light-sensitive material into a developing machine, said device comprising:

transport means for transporting said light-sensitive material as it is placed thereon; and an auxiliary belt conveyor that is driven in the same direction as the transport direction of said transport means and which is spaced above said transport means wherein;

a distance between said auxiliary belt conveyor and said transport means decreases progressively from upstream to downstream in the transport direction of the light-sensitive material.

The transport means is preferably a belt conveyor.

The distance between the auxiliary belt conveyor and the transport means is preferably 5–20 mm in the most upstream area and 2–5 mm in the most downstream area.

In a preferred embodiment, the light-sensitive material transporting device further comprises a distributing means for distributing the light-sensitive material in a direction perpendicular to the transport direction to form a plurality of rows.

In another preferred embodiment, the auxiliary belt conveyor is positioned along a center line of the transport means running in the transport direction and has a smaller width than the transport means.

In still another preferred embodiment, the auxiliary belt conveyor is positioned along a center line of the transport means running in the transport direction and has a smaller width than the transport means, and the distributing means comprises two lift transport means being provided on opposite sides of the auxiliary belt conveyor such that either of the lift transport means lifts the light-sensitive material placed on the transport means and transports the light-sensitive material at least in the direction perpendicular to the transport direction.

In yet another preferred embodiment, the lift transport means transports the light-sensitive material in both directions of the transport direction and the direction perpendicular to the transport direction.

The lift transport means is preferably a sucker unit.

The transport means is preferably inclined to slope downward in the transport direction.

An inclination angle of the transport means is preferably from 5 to 30 degrees.

DETAILED DESCRIPTION OF THE INVENTION

The light-sensitive material distributing device of the invention will now be described in detail with reference to the preferred embodiment shown in the accompanying drawings.

Figure 1:
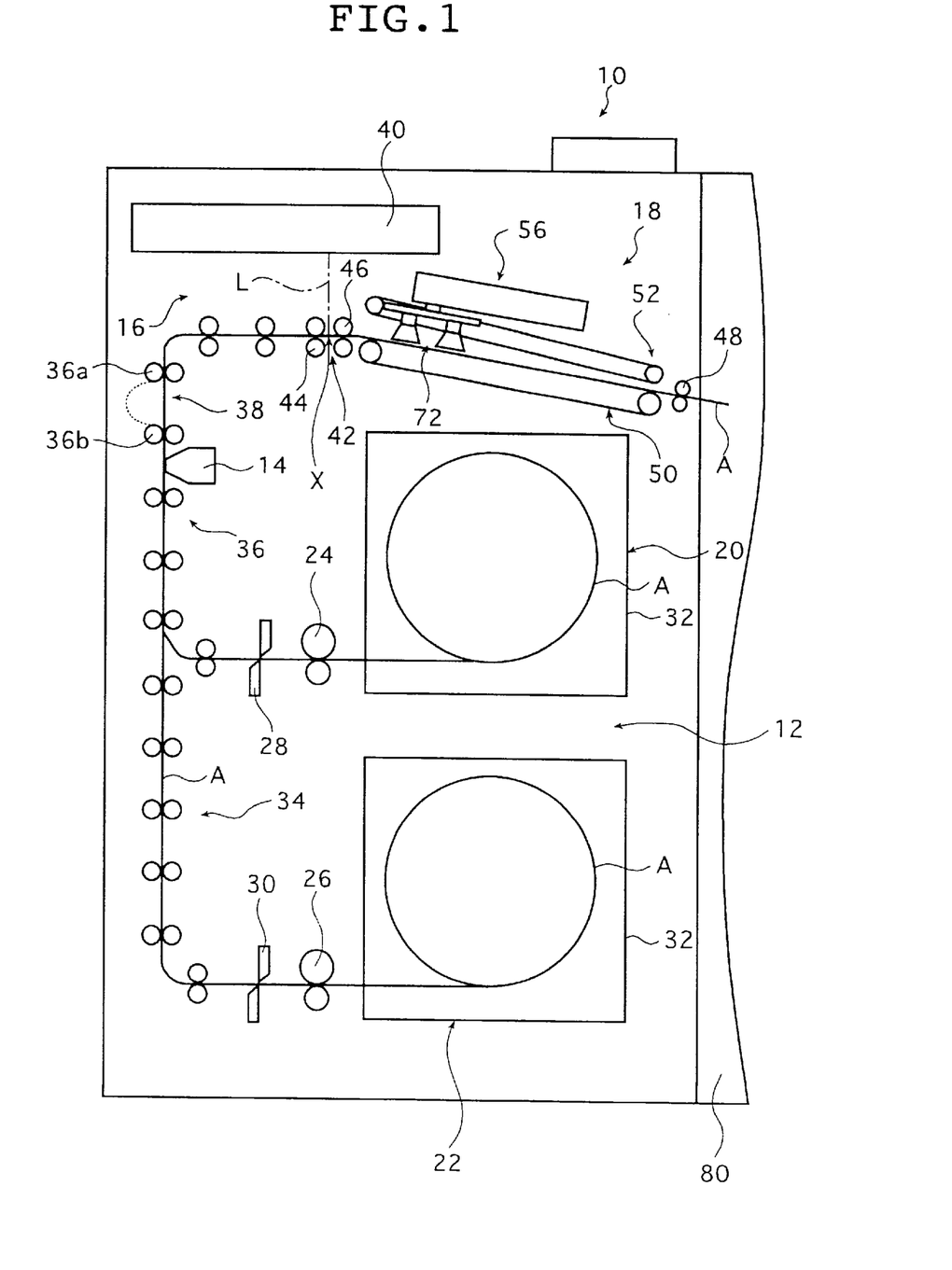
FIG. 1 shows in conceptual form an image recording apparatus employing the light-sensitive material transporting device of the invention.

FIG. 1 shows in conceptual form an image recording apparatus employing the light-sensitive material transporting device of the invention.

The image recording apparatus indicated by 10 in FIG. 1 and which is hereinafter simply referred to as the "recording apparatus 10" is used as the exposing device in the aforementioned digital photoprinter and a web of light-sensitive material is cut to individual sheets of a specified length associated with the prints to be finally produced and, after back printing (recording of a back print) and digital scan exposure, the exposed sheets of the light-sensitive material A are distributed as required into a plurality of rows and supplied to a processor (developing machine) 80.

Having these capabilities, the recording apparatus 10 comprises a light-sensitive material supply section 12, a printer 14 for back print recording, an image recording section 16 which exposes the light-sensitive material A in a recording (exposing) position X, and a distributing section 18 which adopts the light-sensitive material transporting device of the invention (hereinafter referred to as a "transport device").

It should be noted that, in addition to the illustrated components, means of transporting the light-sensitive material A such as transport rollers, transport guides, sensors and various other members are also incorporated, as required, in the recording apparatus 10.

Further referring to the recording apparatus 10, the light-sensitive material supply section 12 (hereinafter referred to as a "supply section 12") comprises loaders 20 and 22, withdrawing roller pairs 24 and 26, and cutters 28 and 30.

The loaders 20 and 22 are sites into which are loaded magazines 32 containing a roll of light-sensitive material A within a lightproof case, with the recording surface side facing outward. The magazines 32 to be loaded into both the loaders 20 and 22 are usually adapted to contain different types of light-sensitive material A which is characterized by their size (width), surface gloss (silk-finish, matte and so forth), specifications (e.g. thickness and base type), and so forth. The number of the magazines 32 that can be loaded is by no means limited to two and it may be adapted to be capable of loading only one magazine or three and more magazines depending on the size and structure of the recording apparatus 10.

The withdrawing roller pair 24 or 26 is operated to withdraw the light-sensitive material A from the magazine 32 loaded into the corresponding loader 20 or 22 and the withdrawn light-sensitive material is transported. The transport stops at the point of time when the light-sensitive material A has been transported downstream from the corresponding cutter 28 or 30 by a length corresponding to each of the prints to be produced. Subsequently, the cutter 28 or 30 turns on to cut the light-sensitive material A to individual sheets of a specified length. It should be noted that one cutter can be used in a plurality of loaders.

The light-sensitive material A taken out of the magazine 32 in the loader 22 and cut into individual sheets of a specified length by means of the cutter 30 is transported upward by means of the first transport section 34 and the second transport section 36, each consisting of a number of transport roller pairs. On the other hand, the light-sensitive material A taken out of the magazine 32 in the loader 20 and cut into individual sheets by means of the cutter 28 is transported upward by means of the second transport section 36. Subsequently, these sheets are both transported in the right direction to the image recording section 16 (scanning transport means 42) with the recording surface side facing upward.

The printer 14 is located in the middle of the second transport section 36.

The printer 14 is used to record on a non-record reverse surface of the light-sensitive material A (where no emulsion is coated) a back print consisting of various pieces of information, such as the date when the picture was taken, the date of printing (exposure), frame number, film identification (ID) number (code), ID number of the camera used to take the picture and ID number of the photoprinter. The light-sensitive material A is subjected to back print recording by means of the printer 14 as it is transported by means of the second transport section 36.

Examples of the printer 14 for back print recording include back printers for use in known photoprinters such as an ink-jet printer, a dot impact printer and a thermal transfer printer. To be compatible with the recently developed Advanced Photo System, the printer 14 is preferably adapted to be capable of marking at least two lines at a time.

A loop forming area 38 is provided between the transport roller pairs 36a and 36b which are downstream of the printer 14 in the second transport section 36.

Thus, the transport speed of the light-sensitive material A in the second transport section 36 is set as follows: the speed in the transport roller pair 36a and subsequent components which are downstream of the loop forming area 38 is the same as the scanning transport speed in the image recording section 16 (scanning transport means 42), whereas the speed in the transport roller pair 36b and prior components which are upstream of the loop forming area 38 is higher than the above scanning transport speed. The light-sensitive material A transported through the second transport section 36 forms a loop in the loop forming area 38 in accordance with its size based on the difference in the upstream/downstream transport speed, as shown by the dotted line in FIG. 1.

In the illustrated recording apparatus 10, this configuration enables the separation of the printer 14 from the image recording section 16 with a short pathlength, whereby a highly precise scanning and transport of the light-sensitive material A in the course of exposure is realized.

The image recording section 16 comprises an exposing unit 40 and scanning transport means 42. The recording light L, modulated in accordance with the image data (recorded image) and which defines the main scanning line perpendicular to the direction in which the light-sensitive material A is transported for scanning, emits from the exposing unit 40 and is incident on the recording position X as the light-sensitive material A is held in a specified recording position X by means of the scanning transport means 42 and transported for scanning, whereupon the light-sensitive material A is exposed by two-dimensional scanning to form a latent image on it.

It should be noted that, in the illustrated image recording section 16, a side registering (edge position regulation) of the light-sensitive material A is performed so that the center of the light-sensitive material A in its main scanning direction can be set to a specified position; i.e., center-referenced exposure of the light-sensitive material A is performed.

The exposing unit 40 is a known optical beam scanner using the light beams including laser beam as the recording light L. The exposing unit 40 is composed essentially of light sources which issue optical beams for exposing the light-sensitive material A with red (R), green (G) and blue (B) lights, a modulating means such as AOM (acoustic optical modulator) which modulates the light beams issued from the light sources in accordance with digital image data, a light deflector such as a polygonal mirror which deflects the modulated light beams in a main scanning direction, an fθ (scanning) lens with which the light beams deflected in the main scanning direction (normal to the planes of FIGS. 1 and 2) are focused to form beam spot of a specified diameter at a specified point in the recording position X in cooperation with specified beam optics, and so forth.

The exposing unit 40 may be replaced by various kinds of digital exposing means using various arrays of light-emitting devices and spatial modulating devices which extend in a direction perpendicular to the direction in which the light-sensitive material A is transported for scanning. Specific examples of such arrays include a PDP (plasma display) array, an ELD (electroluminescent display) array, an LED (light-emitting diode) array, an LCD (liquid-crystal display) array, a DMD (digital micromirror device) array, and a laser array.

On the other hand, the scanning transport means 42 comprises two transport roller pairs 44 and 46 that are provided on opposite sides of the recording position X (scanning line), and an exposure guide (not shown) to hold more precisely the light-sensitive material A in the recording position X. The light-sensitive material A is transported for scanning in the auxiliary scanning direction perpendicular to the main scanning direction while it is held in the recording position X. The light beams as the recording light L are deflected in the main scanning direction, so the light-sensitive material A is exposed by two-dimensional scanning with the recording light L modulated in accordance with the image data to thereby form a latent image on the material.

Another example of the scanning transport means is by using an exposing drum that transports the light-sensitive material A as it is held in the recording position X and two nip rollers which are provided on opposite sides of the recording position X in such a way that they are held in contact with the exposing drum.

The distributing section 18 is located downstream of the image recording section 16.

Figure 4:
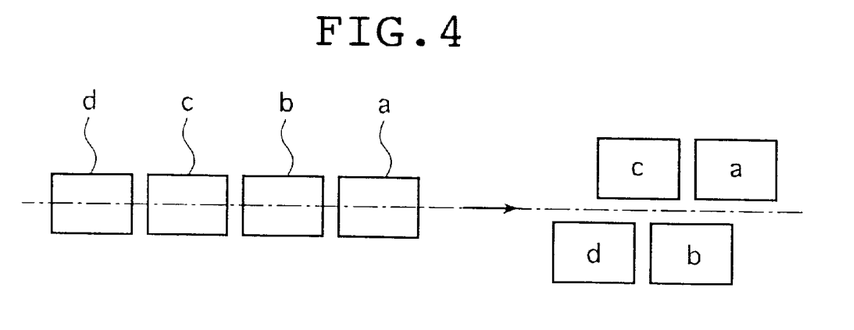
FIG. 4 illustrates in conceptual form one method of distributing sheets of a light-sensitive material in the image recording apparatus shown in FIG. 1.

The distributing section 18 adopts the transport device of the invention. The distributing section 18 receives the light-sensitive material A ejected from the scanning transport means 42 in the image recording section 16 and distributes, as required, individual sheets of the light-sensitive material A in a lateral direction which is perpendicular to the direction of their transport so as to form a plurality of rows that overlap in the transport direction as shown in FIG. 4; the sheets are then transported to the transport roller pair 48, through which the light-sensitive material A is supplied to the processor 80 (entry into the processor is performed). As the result, the throughput of the processor 80 can be almost doubled in two rows and tripled in three rows and the time difference between development processing and exposure is practically cancelled.

Figure 2:
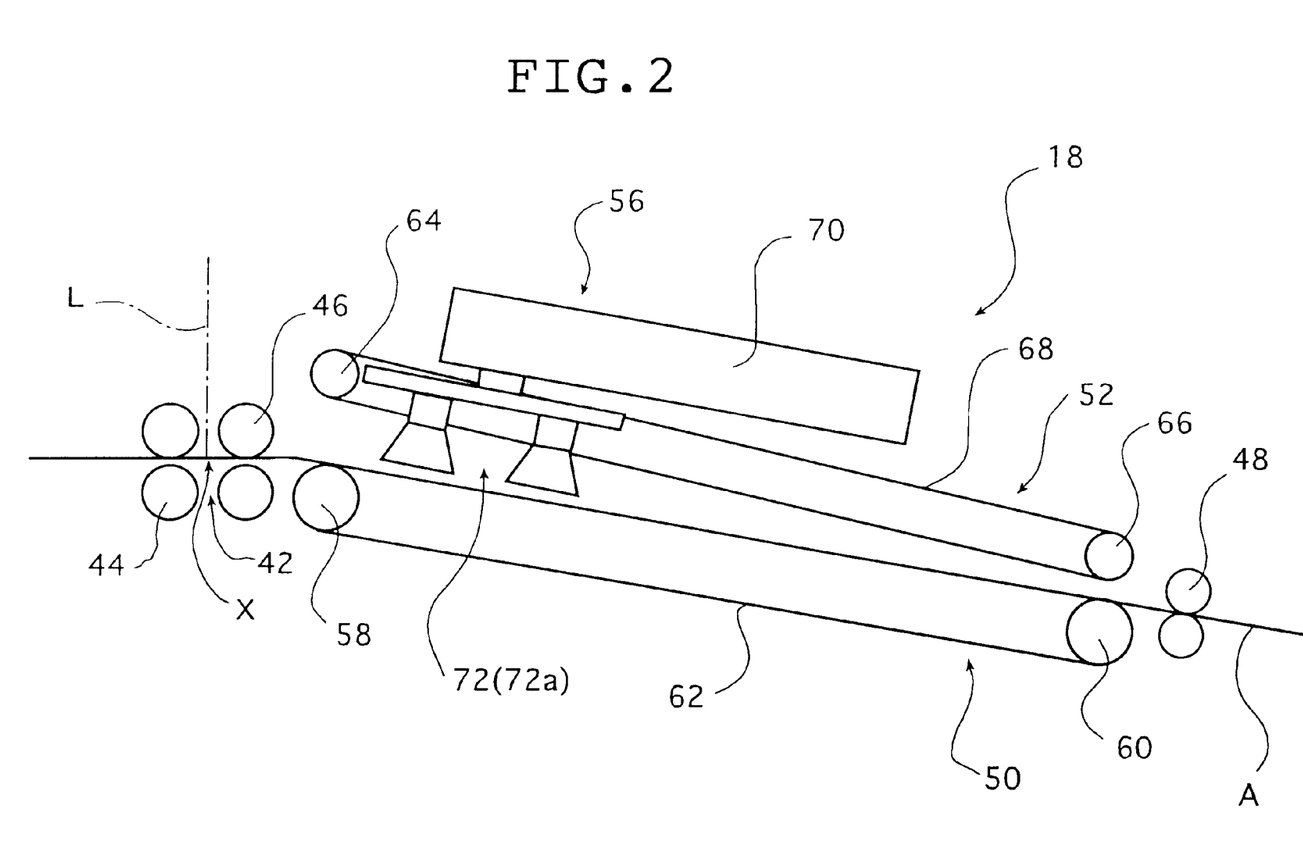
FIG. 2 is a diagrammatic side view of the light-sensitive material transporting device of the invention.
Figure 3:
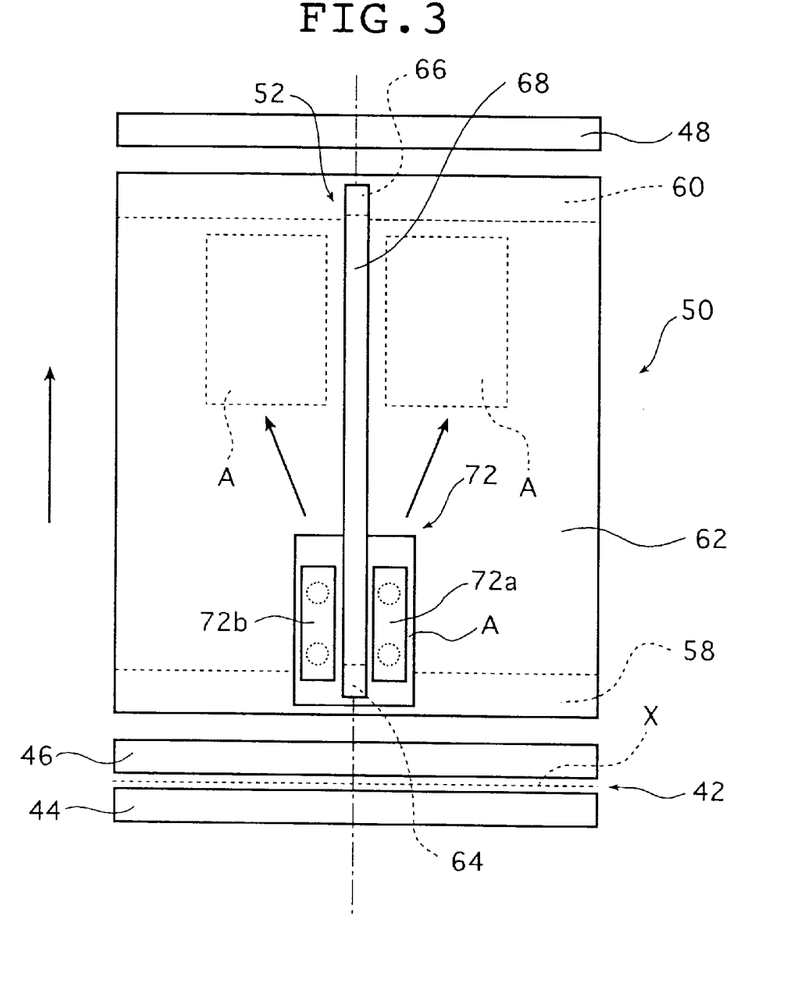
FIG. 3 is a diagrammatic plan view of the light-sensitive material transporting device of the invention.

FIG. 2 is a diagrammatic side view of the distributing section 18 and FIG. 3 is a diagrammatic plan view, with part taken away, of the same section. The distributing section 18 is composed of the transport device of the invention comprising a belt conveyor 50 and an auxiliary belt conveyor 52, as well as a distributing device 56. The light-sensitive material A exposed in the image recording section 16 is ejected onto the belt conveyor 50, which carries the exposed light-sensitive material A to a specified position, whereupon it is lifted by the distributing device 56 and transported obliquely downstream to be set aside to either right or left; the light-sensitive material A is replaced on the belt conveyor 50 and transported as such to be fed through the transport roller pair 48.

The belt conveyor 50 and the auxiliary belt conveyor 52 are provided immediately downstream of the image recording section 16 (particularly the scanning transport means 42 in it) which performs exposure on a center-referenced basis and which coincides with the belt conveyors 50 and 52 in terms of the center in a transverse direction (along the roller axis); the term "center" as used hereinafter has this meaning.

The belt conveyor 50 is of a known type that is composed of two rollers 58 and 60, an endless belt 62 stretched between these rollers and a drive source which is not shown in FIG. 2.

The belt conveyor 50 transports the light-sensitive material A as it is placed on the conveyor. On the other hand, the scanning transport means 42 and the transport roller pair 48 which feeds the light-sensitive material A into the processor 80 (or the transport means in the processor 80) typically transport the light-sensitive material A as it is held between two members.

Therefore, even if part of the light-sensitive material A in the process of exposure is ejected from the scanning transport means 42 to be replaced on the belt conveyor 50, the transport speed of the light-sensitive material A is governed by the scanning transport means 42 and any difference that may occur between the travelling speed of the belt conveyor 50 and the scanning transport speed will in no way affect the speed at which the light-sensitive material A being exposed is transported for scanning; hence, the distributing section 18 can be provided immediately after the scanning transport means 42.

If the light-sensitive material A is released from the scanning transport means 42, it is transported by the belt conveyor 50 at its speed of travel to be fed through the transport roller pair 48. The travelling speed of the transport roller pair 48 which performs processor entry of the light-sensitive material A is equal to the transport speed in the processor 80 and typically slower than the travelling speed of the belt conveyor 50 and the like in the recording apparatus 10. However, if the transport of the light-sensitive material A to the transport roller pair 48 is performed by the belt conveyor 50, its transport speed at the point of time when it has been held between the two members of the transport roller pair 48 is governed by that roller pair 48 and, hence, the exposed light-sensitive material A can be supplied into the processor 80 in a smooth and safe manner.

In the recording apparatus 10, the distance from the scanning transport means 42 (particularly the transport roller pair 46) to the transport roller pair 48 depends on and must be greater than the length of a print that has the largest size in the transport direction of all the prints to be handled by the recording apparatus 10; therefore, the position and transport length of the belt conveyor 50 are set at such values that depending on the distance between the scanning transport means 42 and the transport roller pair 48, the light-sensitive material A can be transported from the former to the latter in a consistent manner. If the distance between the scanning transport means 42 and the transport roller pair 48 is too long, the overall pathlength increases to eventually increase the equipment cost and size; this is another consideration that must be included in determining the distance between the scanning transport means 42 and the transport roller pair 48.

The lateral size (width) of the belt conveyor 50 depends on various factors such as the maximum print size across width and the number of rows into which sheets of the light-sensitive material are to be distributed and a suitable value may be selected that ensures consistent and positive transport of the light-sensitive material A.

The auxiliary belt conveyor 52 provided above the belt conveyor 50 is also of a known type that is composed of two rollers 64 and 66, an endless belt 68 stretched between these rollers and a drive source which is not shown in FIG. 2. The auxiliary belt conveyor 52 is less wide than the belt conveyor 50, positioned on the center line through the belt conveyor 50, and driven at the same speed in the same direction as the belt conveyor 50.

The auxiliary belt conveyor 52 is not such that the light-sensitive material A is transported as it is held between the auxiliary belt conveyor 52 and the belt conveyor 50. In fact, the auxiliary belt conveyor 52 is spaced from the belt conveyor 50 by a certain distance that decreases progressively from the upstream position (entrance side) to the downstream position (exit side).

Briefly, the primary function of the auxiliary belt conveyor 52 is to hold down the light-sensitive material A placed on the belt conveyor 50 so as to depress any curl of the light-sensitive material A and keep it level. Having this auxiliary belt conveyor 52, the transport device of the invention ensures that the light-sensitive material A is transported in a consistent and positive way not only by means of the belt conveyor 50 but also in the subsequent stage within the processor 80 (which, in the illustrated case, is subsequent to the transport roller pair 48). It should also be noted that in the illustrated case, the levelling of the light-sensitive material A helps insure that it is retained positively by the sucking action of the distributing device 56 to be described below.

The auxiliary belt conveyor 52 is spaced from the belt conveyor 50 and the clearance is adjusted to decrease progressively toward the downstream position; this design provides a positive means of ensuring that the transport of the light-sensitive material A with the transport device of the invention will in no way affect the transport of the light-sensitive material by the upstream scanning transport means 42 and the downstream transport roller pair 48 and, in addition, even the light-sensitive material with curls can be received positively and levelled effectively.

The clearance between the auxiliary belt conveyor 52 and the belt conveyor 50 is not limited to any particular value and may be determined as appropriate for relevant factors such as the degree of the curl in the light-sensitive material A to be transported. Preferably, the clearance in the most upstream area is adjusted to 5–20 mm whereas the clearance in the most downstream area is adjusted to 2–5 mm because the light-sensitive material A can not only be positively received between the auxiliary belt conveyor 52 and the belt conveyor 50 but also be effectively corrected for any curl it has and because every effect the transport device of the invention may have on the upstream and downstream transport means can be positively eliminated.

In the illustrated case, the transport device of the invention is located in the distributing section 18 and the auxiliary belt conveyor 52 which is less wide than the belt conveyor 50 is positioned on the center line through it in order to ensure that individual sheets of the light-sensitive material A are distributed either to right or left to form a plurality of rows by means of the distributing device 56 to be described below. This is not the sole case of the invention and the auxiliary belt conveyor 52 may have the same width as the belt conveyor 50 or two auxiliary belt conveyors may be placed on opposite sides of the center line through the belt conveyor 50; if desired, three auxiliary belt conveyors may be employed, one of which is positioned on the center line through the belt conveyor 50 and the other two on opposite sides of the center line. Any suitable arrangement that can accomplish efficient transport of the light-sensitive material may be employed as needed by the specific use of the transport device of the invention, the light-sensitive material to be transported and other factors.

In the illustrated distributing section 18, the belt conveyor 50 is inclined to slope downward in the transport direction of the light-sensitive material A. This is a preferred embodiment in that the occurrence of troubles such as jamming of the light-sensitive material A due to the curl it usually possess and its buckling are effectively prevented to ensure that the distributing section 18 can accept the light-sensitive material A from the scanning transport means 42 and supply it to the transport roller pair 48 in a more smooth and consistent manner.

The angle by which the belt conveyor 50 inclines downward is not limited to any particular value, except that if it is too large, the light-sensitive material A will just slide down; therefore, the inclination of the belt conveyor 50 is preferably between about 5 and 30 degrees.

The travelling speed of the belt conveyor 50 and the auxiliary conveyor 52 may be determined as appropriate depending upon such factors as the throughput of the recording apparatus 10 and the scanning transport speed. Preferably, the travelling speed of the belt conveyor 50 and the auxiliary conveyor 52 is slightly higher than the scanning transport speed in order to ensure that any effect that may be caused on the transport of the light-sensitive material A for scanning when it is placed on (brought into contact with) the belt conveyor 50 can be eliminated more positively.

In the illustrated case, the transport device of the invention has above it the distributing device 56 which transports individual sheets of the light-sensitive material A in a lateral direction to form a plurality of rows. The distributing device 56 is composed of a drive unit 70 and two sucker units 72a and 72b which may be collectively designated by 72. The light-sensitive material A transported to a specified position on the belt conveyor 50 is slightly lifted by the sucking action of the sucker unit 72a, transported obliquely downstream to the right with respect to the transport direction of (the term "right" as used hereinafter has this meaning) and replaced on the belt conveyor 50; alternatively, the light-sensitive material A is similarly lifted and transported obliquely downstream to the left by means of the sucker unit 72b; as the result of these movements, sheets of the light-sensitive material A are transported to be distributed in a lateral direction into a plurality of rows.

It should be noted that the sucker units 72 suck or release the light-sensitive material A by means of the drive unit 70, which also allows both horizontal and vertical movements of the sucker units 72.

Therefore, in the illustrated case, the width of the auxiliary belt conveyor 52 must be set in such a way that both sucker units 72 can positively suck the light-sensitive material A in the form of cut sheets and hold them in position as needed by their minimum size in the direction of width over which the individual sheets are to be distributed.

In the distributing device 56 described above, individual sheets of the light-sensitive material A are lifted and transported in a lateral direction, so they can be rapidly distributed without being constrained by the travelling speed of the belt conveyor 50 and other factors. As a further advantage, a sheet of the light-sensitive material A that has been already transported onto the belt conveyor 50 is lifted in preparation for being set aside and, hence, will not interfere with the transportation of the next coming sheet of the light-sensitive material A onto the belt conveyor 50. As the result, sheets of the light-sensitive material A emerging from the scanning transport means 42 can be successively received by the belt conveyor 50 for distribution into a plurality of rows.

Briefly, the illustrated distributing section 18 is such that the belt conveyor 50 for transporting the light-sensitive material A as it is placed on the conveyor is combined with the distributing device 56 which lifts individual sheets of the light-sensitive material A and distributes them into a plurality of rows. As the result, the heretofore required high-speed transport section and speed-regulating section are obviated and the distributing section is of short length in the transport path to realize a smaller size, a simpler construction at a lower cost. This section can transport the light-sensitive material A from the recording section 16 to the processor 80 in a smooth and consistent manner without affecting the transport of the light-sensitive material A for scanning and its transport through the processor 80 and, what is more, individual sheets of the light-sensitive material A can be positively distributed into a plurality of rows as they travel from the recording section 16 to the processor 80.

To distribute the sheets of light-sensitive material A in the distributing section 18, various methods may be employed. For example, by alternately activating the sucker units 72 and moving them either to the right or left, the individual sheets of the light-sensitive material A that have been transported to a specified position on the belt conveyor 50 can be distributed into two rows as shown in FIG. 4. These movements may be combined with straight passage of the light-sensitive material A without making its lateral transport; for example, the first coming sheet is set aside to the left, the next sheet is set aside to the right but the third sheet is simply allowed to pass straight; in this way, the successive sheets of the light-sensitive material A can be distributed into three rows.

It should be noted that in order to insure positive sucking and holding of the light-sensitive material A with the sucker units 72, the transport of the belt conveyor 50 may be brought to a temporary stop when the light-sensitive material A is sucked and released.

The methods of moving the sucker units 72 both horizontally and vertically with the drive unit 70 are not limited in any particular way and various known methods may be employed, as exemplified by means of using links, means of using cams, means of using guide rails and holes, means of using gears, means of using a rack-and-pinion, screw transmission, wrapping connector driving or cylinders, as well as suitable combinations of these means. To suck and hold the light-sensitive material A with the sucker units 72, any known means such as a vacuum pump may be employed.

In the illustrated case, two sucker units 72a and 72b are used; alternatively, only one sucker unit 72 may be used to distribute sheets of the light-sensitive material A into a plurality of rows by alternating the straight passage of one sheet with setting aside the next sheet either to the right or left.

Successive sheets of the light-sensitive material A may be distributed in such a way that they already overlap at the point of time when they have been distributed into a plurality of rows on the belt conveyor 50 in the distributing section 18. In another case, the sheets are not allowed to overlap one another on the belt conveyor 50 but are caused to overlap by the difference in speed between the belt conveyor 50 and the transport roller pair 48.

The greater the overlap of the sheets of the light-sensitive material A that are transported through the processor 80, the higher the throughput of the processor 80. However, if finished prints emerge from the processor 80 in such a way that the distance between two consecutive sheets (as measured between their trailing edges if they emerge from the processor 80 as they are held between nip rollers or other pinching means) is too small, it may be difficult to stack the prints in the order of exposure depending on factors such as the composition of the stacker or sorter. Hence, this possibility has to be considered when distributing sheets of the light-sensitive material A into a plurality of rows by means of the distributing section 18.

It should also be mentioned that not all kinds of light-sensitive material need be distributed in the distributing section 18; if the width of the processor 80 and other design factors are such that sheets larger than a certain size cannot be processed in a plurality of rows or in the case of performing batchwise rather than continuous processing, the successive sheets need not be distributed but may simply be fed into the processor 80 in a single row.

In the distributing operation, not all sizes of sheets need be distributed into the same number of rows and the number of rows into which successive sheets are distributed may be varied with the size of the light-sensitive material A being handled; for example, sheets of an L size may be distributed into three rows and sheets of a larger size that tolerate distribution may be distributed into two rows. In other cases such as processing a mixture of panoramic and L sizes, the distributing section 18 may be controlled in such a way that sheets of a panoramic size are not distributed but simply passed straight.

As already mentioned, the sheets of light-sensitive material A transported by the distributing section 18 are further transported by the transport roller pair 48 into the processor 80, where they are subjected to the necessary steps of processing including color development, bleach-fixing and rinsing, and thereafter dried to produce finished prints, which emerge from the processor.

While the light-sensitive material transporting device of the present invention has been described above in detail, it should be noted that the invention is by no means limited to the foregoing cases and various improvements and modifications may course be made without departing from the scope and spirit of the invention.

As described above in detail, the light-sensitive material transporting device of the present invention is suitable for use in an image recording apparatus that performs exposure on cut sheets of a light-sensitive material and which feeds the exposed sheets into a developing machine. The device is capable of transporting the light-sensitive material in a consistent and smooth manner while correcting the "curls" it has. In addition, by adopting the device in the distributing section which distributes individual sheets of the light-sensitive material into a plurality of rows, the pathlength of the light-sensitive material can be shortened while, at the same time, the cost of the apparatus is measurably reduced.

What is claimed is:

1. A light-sensitive material transporting device for transporting a light-sensitive material of a cut sheet type having a specified length in a transport direction in an image recording apparatus that exposes said light-sensitive material to form a latent image and which feeds the exposed light-sensitive material into a developing machine, said device comprising:

transport means for transporting said light-sensitive material as it is placed thereon; and an auxiliary belt conveyer located above said transport means with a distance therebetween, said auxiliary belt conveyer being driven in the same direction as the transport direction of said transport means, wherein said distance between said auxiliary belt conveyor and said transport means decreases progressively from upstream to downstream in the transport direction of the light-sensitive material.

2. The light-sensitive material transporting device according to claim 1, wherein said transport means is a belt conveyor.

3. The light-sensitive material transporting device according to claim 1, wherein the distance between said auxiliary belt conveyor and said transport means is 5–20 mm in the most upstream area and 2–5 mm in the most downstream area.

4. The light-sensitive material transporting device according to claim 1, further comprising a distributing means for distributing the light-sensitive material in a direction perpendicular to the transport direction to form a plurality of rows.

5. The light-sensitive material transporting device according to claim 1, wherein said auxiliary belt conveyor is positioned along a center line of said transport means running in the transport direction and has a smaller width than said transport means.

6. The light-sensitive material transporting device according to claim 4, wherein said auxiliary belt conveyor is positioned along a center line of said transport means running in the transport direction and has a smaller width than said transport means, and said distributing means comprises two lift transport means being provided on opposite sides of said auxiliary belt conveyor such that either of said lift transport means lifts the light-sensitive material placed on said transport means and transports the light-sensitive material at least in the direction perpendicular to said transport direction.

7. The light-sensitive material transporting device according to claim 6, wherein said lift transport means transports the light-sensitive material in both directions of said transport direction and the direction perpendicular to said transport direction.

8. The light-sensitive material transporting device according to claim 6, wherein said lift transport means is a sucker unit.

9. The light-sensitive material transporting device according to claim 1, wherein said transport means is inclined to slope downward in the transport direction.

10. The light-sensitive material transporting device according to claim 9, wherein an inclination angle of said transport means is from 5 to 30 degrees.

* * * * *